US010196155B2

(12) United States Patent
Martin

(10) Patent No.: US 10,196,155 B2
(45) Date of Patent: Feb. 5, 2019

(54) UNMANNED AERIAL DELIVERY SYSTEM

(71) Applicant: Joseph Martin, Grand Island, NY (US)

(72) Inventor: Joseph Martin, Grand Island, NY (US)

( * ) Notice: Subject to any disclaimer, the term of this patent is extended or adjusted under 35 U.S.C. 154(b) by 915 days.

(21) Appl. No.: 14/481,456

(22) Filed: Sep. 9, 2014

(65) Prior Publication Data

US 2016/0257423 A1  Sep. 8, 2016

(51) Int. Cl.
*B64C 39/02* (2006.01)
*B64F 1/00* (2006.01)
*A47G 29/14* (2006.01)

(52) U.S. Cl.
CPC .............. *B64F 1/00* (2013.01); *A47G 29/14* (2013.01); *B64C 39/024* (2013.01); *B64C 2201/027* (2013.01); *B64C 2201/042* (2013.01); *B64C 2201/066* (2013.01); *B64C 2201/128* (2013.01)

(58) Field of Classification Search
CPC .......... B64F 1/007; B64F 1/222; B64F 1/305; B64F 1/228; B64F 1/32; B64F 1/31; B64F 1/14; B64F 1/364; B64F 5/00; B64F 1/00; B64C 39/024; B64C 2201/027; B64C 2201/141; B64C 2201/20; B64C 2201/128; B64C 2201/024; B64D 1/10; G05D 1/101; B60L 11/1825; B60L 11/1829; B60L 11/182; B60L 11/1816
See application file for complete search history.

(56) References Cited

U.S. PATENT DOCUMENTS

| | | | |
|---|---|---|---|
| 7,318,564 B1 | 1/2008 | Marshall | |
| 7,714,536 B1 | 5/2010 | Silberg | |
| 8,178,825 B2 | 5/2012 | Goossen | |
| 8,511,606 B1 * | 8/2013 | Lutke | B64C 39/028 244/100 R |
| 8,899,903 B1 * | 12/2014 | Saad | B65G 67/00 320/109 |
| 9,422,139 B1 * | 8/2016 | Bialkowski | B66D 1/48 |
| 9,434,481 B2 * | 9/2016 | McGeer | B64F 1/02 |
| 9,494,937 B2 * | 11/2016 | Siegel | G05D 1/0027 |
| 9,527,588 B1 * | 12/2016 | Rollefstad | B64C 39/024 |

(Continued)

FOREIGN PATENT DOCUMENTS

WO  WO 2007141795 A1 * 12/2007  ........... B64C 39/022

*Primary Examiner* — Joshua J Michener
*Assistant Examiner* — George Andonyan
(74) *Attorney, Agent, or Firm* — Vincent G. LoTempio; Kloss, Stenger & LoTempio; David T. Stephenson

(57) ABSTRACT

An unmanned aerial vehicle delivery system utilizes an unmanned aerial vehicle (UAV) to deliver packages between an initiation point and multiple delivery points at a raised elevation. The UAV flies between points in an organized manner, using logistical, maintenance and safety software, commands from a delivery organization, and guidance tools to coordinate deliveries. One advantage of the system is that the UAV engages the delivery points at a raised elevation, rather than the ground level. The UAV docks through an elevated structure at the delivery point for delivering the package and replenishing a power source. The package is conveyed from a docking end and through a central shaft of the elevated structure by means of an elevator. The package then travels to a lower structure, such as a house or office, for pickup. After completion of the delivery, the UAV replenishes its power source and/or continues on the delivery route.

3 Claims, 3 Drawing Sheets

(56) References Cited

U.S. PATENT DOCUMENTS

| | | | | |
|---|---|---|---|---|
| 9,815,684 B2* | 11/2017 | Kamradt | ............... | B67D 7/845 |
| 2003/0025034 A1* | 2/2003 | Akahori | ................... | B64B 1/06 |
| | | | | 244/96 |
| 2014/0319272 A1* | 10/2014 | Casado Magana | ....... | B64F 1/04 |
| | | | | 244/110 E |
| 2015/0158598 A1* | 6/2015 | You | .......................... | B64F 1/18 |
| | | | | 701/16 |
| 2015/0336669 A1* | 11/2015 | Kantor | .............. | G01C 21/3415 |
| | | | | 701/3 |
| 2016/0144982 A1* | 5/2016 | Sugumaran | ............. | B64C 25/32 |
| | | | | 244/103 R |

* cited by examiner

UNMANNED AERIAL DELIVERY SYSTEM

FIELD OF THE INVENTION

The present invention relates generally to an unmanned aerial vehicle delivery system. More so, an unmanned aerial vehicle delivery system provides an unmanned aerial vehicle that docks with an elevated structure at a delivery point to deliver or receive a package(s) and recharge or replenish a power source.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon.

By way of educational background, another aspect of the prior art generally useful to be aware of is that An unmanned aerial vehicle (UAV), commonly known as a drone and referred to as a Remotely Piloted Aircraft (RPA) by the International Civil Aviation Organization (ICAO), is an aircraft without a human pilot aboard. Its flight is controlled either autonomously by onboard computers or by the remote control of a pilot on the ground or in another vehicle. The typical launch and recovery method of an unmanned aircraft is by the function of an automatic system or an external operator on the ground Unmanned aerial vehicles, which are also called pilotless aircraft or remote piloted vehicle, are finding their way to market recently, and in the near future, in numerous commercial and civil uses. From thermal or video camera imaging, to parcels delivery, farming, surveying of crops, acrobatic aerial footage in filmmaking, search and rescue operations, construction industry, inspecting powerlines, dams, pipelines, counting wildlife, delivering medical supplies to remote or otherwise inaccessible regions, determining of illegal hunting by animal-rights advocates, livestock monitoring, wildfire mapping, pipeline security, home security, road patrol, and anti-piracy, search and rescue, dropping life preservers to plural swimmers, damage assessment, all-weather imaging through the clouds, rain, or fog, and in a daytime or night times conditions, all in real-time. Also currently there exists a problem with parcel delivery method such as UPS for packages that need a signature which often involves confirmation of delivery of a package or item where human beings interaction is necessary to accept delivery which often requires repeat delivery times which are costly and time-consuming.

Modern local transportation networks rely heavily on ground infrastructure for the transportation of goods and people. More than half of the earth's population now lives in cities, with more than half a billion people living in megacities with populations exceeding 10 million people. In these high-density urban environments demand on ground transportation infrastructure has increased and continues to increase to the point that many metropolitan areas are heavily congested and road transportation networks are very inefficient.

It is well known that air rights are a type of development right in real estate, referring to the empty space above a property. Generally speaking, owning or renting land or a building gives one the right to use and develop the air rights. In the United States, the Federal Aviation Administration (FAA) has the sole authority to control all airspace, exclusively determining the rules and requirements for its use. The general rule is that airplanes must fly high enough that, in the event of an engine failure, the pilot can land the plane without undue hazards to persons or property on the ground.

Currently, electrically powered UAVs are limited in range and duration by the size and weight of the batteries or other power source which they can carry. Batteries and or fuel can make up a significant percentage of the available payload weight. Consequently, there is an inherent tradeoff between duration and useful payload. Because of these constraints, the flight times of electrically powered UAVs are typically limited to less than one hour. Additionally, the distance traveled from a base location is also limited. Also of concern is that UAV batteries slowly lose their energy even when they are completely powered down. Also if a UAV has to remain at a location because of unforeseen flying difficulties such as bad weather or if it has mechanical problems it cannot remain charged. This limits the ability of UAVs to shut down for extended periods of time and then be useful again if the vehicle cannot be recharged. Because of these problems, it is desired to have a means to recharge UAV batteries that does not require a return to the base location. It is also desired to have a means to recharge the batteries that enables the UAV to perform job functions in a more efficient manner, thus enhancing logistical range of UAV.

Even though the above cited methods for delivering a package with an unmanned aerial vehicle address some of the needs of the market, an unmanned aerial vehicle delivery system that docks at a tower, or network of towers, to deliver and or retrieve a package or packages, while simultaneously recharging/refueling a power source is still needed.

SUMMARY OF THE INVENTION

The present invention is directed to an unmanned aerial vehicle delivery system that provides an unmanned aerial vehicle (UAV) to deliver at least one package between an initiation point and another point or a plurality of delivery points at a raised elevation. The transport of the package(s) at the raised elevation provides numerous advantages to achieving a more efficient delivery route. Additionally, the delivery system controls and monitors all aspects of the UAV through logistical software. The logistical, maintenance and safety software is configured to coordinate various aspects of the UAV and delivery route, including, without limitation, the sequence of deliveries, the route taken by the UAV, permissions for the deliveries, mechanical condition and maintenance of the UAV, changes in the delivery route, and weather patterns. The UAV maintains wireless communication with the initiation point and the plurality of delivery points to enable a real time delivery, such that spontaneous changes to the delivery can be made.

The UAV performs deliveries of the at least one package through a network comprised of an initiation point, a plurality of delivery points, and/or recharging/refueling point(s). The UAV flies between necessary points in an organized manner, using logistical software, commands from a package delivery organization, and guidance tools to coordinate the deliveries. One of the advantages of the present invention is that the UAV engages the delivery points at a raised elevation. In one embodiment, the UAV docks at an elevated structure at the delivery point for delivering the package and replenishing a power source on the UAV. The package is conveyed along the elevated structure to a lower structure for pickup and secure retention. After, before or even simultaneously during the delivery, the UAV may replenish its power source and/or continue on the delivery route. The elevated delivery routes and delivery point(s) enable the UAV to provide a more efficient delivery by avoiding ground routes, delivering directly to elevated structures, which are generally easier to access than a ground delivery point. The delivery system also provides a more efficient logistical network of deliveries by enabling the UAV to replenish its power source at any of the delivery points, and thus negates the need to return to the initiation point to replenish the power source. The delivery system also provides logistical accounting to confirm deliveries made without a recipient being present. Because of instant confirmation and the security of the system there is never a need for multiple delivery attempts such that is common today by a package carrier when the recipient is not at home.

In some embodiments, the UAV is configured to deliver the at least one package at a raised elevation. The UAV may include, without limitation, a drone, a helicopter, a propeller plane, and a hovercraft. The UAV may utilize a power source for operation. The power source may include, without limitation, a rechargeable battery, an accumulator, an electrical battery, a fuel cell, natural gas and a fuel tank. The UAV utilizes an initiation point as a home base. The UAV receives the package, performs maintenance, and returns after completing the deliveries to the initiation point. The initiation point may include, without limitation, a central office for a package delivery organization, a warehouse, a fueling depot, a maintenance garage, and a data storage site.

In some embodiments, the plurality of delivery/recharge points may include, without limitation, residential homes, retail stores, commercial warehouses, and governmental buildings. The delivery points are not necessarily elevated at the package pickup point, but rather, at the elevated structure, where the UAV docks for performing the delivery and power source replenishment. The elevated structure may include, without limitation, a tower that extends upwardly from the lower structure. The lower structure, may include a residential house, an office building, and a retail store that are positioned beneath the elevated structure. The lower structure joins with and extends upwardly through the elevated structure to form the delivery point. Examples of at least one package may include, without limitation, a book, an auto part, food, videos, medicine, postal mail, and an electronic device.

In one embodiment, the delivery system addresses the logistical and practical needs of a package delivery organization through use of a logistical software. The software is configured to enable the package delivery organization to control and monitor the status of the UAV during delivery to the plurality of delivery points. The software also enables the package delivery organization to control every aspect of the UAV, both before and during deliveries between the initiation point and the network of delivery/recharge points. The delivery system addresses the logistical tracking of delivered packages and electronically confirms secured delivery.

In operation, the UAV initiates the delivery from an initiation point where the at least one package is loaded for delivery. The logistical software can coordinate the loading of the packages based on the sequence of delivery points on the route and other route conditions. The UAV is configured with a package storage section. The package storage section is configured to receive the package at the initiation point, store the package during the delivery route, and unload the package at the destination point. The package storage section may be configured to receive variously sized and dimensioned packages, including but not limited to liquids, gases, and animals.

After receiving the package from the initiation point, the UAV utilizes a guidance system to navigate the delivery route to the plurality of delivery points. In one embodiment, the guidance system may include a remote sensing mechanism that guides the UAV to the elevated structure. The remote sensing mechanism may include, without limitation, electromagnetic spectrum sensors, gamma ray sensors, biological sensors, and chemical sensors. In one embodiment, the UAV's electromagnetic sensors typically include visual spectrum, infrared, or near infrared cameras as well as radar systems.

After receiving the appropriate permissions and monitoring the conditions of the route from the initiation point and/or the logistical software, the UAV navigates the optimal delivery route to perform the deliveries to the plurality of delivery points. In some embodiments, the UAV identifies the appropriate delivery point. However, in other embodiments, a package recipient may dictate the route taken by the UAV, hereby instructions for delivery time are sent to the UAV in real time. The UAV docks at the elevated structure over the delivery point for delivering the package and/or replenishing the power source.

The elevated structure may include, without limitation, a tower that extends upwardly from the lower structure. Those skilled in the art, in light of the present teachings, will recognize that the height of the elevated structure is dependent on air flight regulations. For example, in congested areas, aircraft, such as the UAV, may be required to stay 1,000 feet higher than any obstacle, such as the delivery point within a 2,000 feet radius of the UAV. However, in noncongested, sparsely populated areas, or over bodies of water, the UAV must remain at least 500 feet from the delivery point. Nonetheless, the delivery point does have regulated air rights that enable the UAV to engage the elevated structure.

The elevated structure is disposed to join with the lower structure. In one embodiment, the lower structure may include a residential house, an office building, and a retail store that are positioned beneath the elevated structure. Examples of the at least one package may include, without limitation, a book, an auto part, food, videos, medicine, and an electronic device. However in one alternative embodiment, the package may include garbage, whereby the garbage travels from the lower structure to the docking end of the tower for pickup by the UAV.

In some embodiments, the elevated structure comprises a central shaft and a docking end. The docking end is configured to receive the UAV for docking and recharging. In one embodiment, the docking end utilizes electromagnetic forces to lock the drone into a docking position. This enhances the safety of the drone and the elevated structure during inclimate weather or mechanical failures. The UAV comprises a docking section that mates with the docking end to form a secure coupling to the elevated structure. The docking end also receives the at least one package for conveyance to the lower structure.

In one embodiment, an elevator, such as a dumb waiter, extends from the docking end to the lower structure, along a central shaft for conveying the at least one package to the lower structure. However, in other embodiments, a gravity fed mechanism may be used to convey the package along the central shaft of the elevated structure. Once the package travels down the central shaft, it can be accessed from the lower structure. However, in some embodiments, such as returned packages, the package is conveyed from the lower structure to the docking end of the elevated structure.

In another embodiment, the docking end of the elevated structure may also include a power supply apparatus that replenishes the power source on the UAV. The power supply apparatus can include an AC power source, a 12 volt DC outlet, a solar power source, and a fuel tank or other power sources currently known in the art. Those skilled in the art will recognize that a power supply apparatus, such as a battery charger for a rechargeable battery in the UAV also monitors battery voltage, current flow, and battery temperature to minimize charging time. In some embodiments, the system comprises at least one recharging point, separate from the initiation point or delivery points, where the UAV may replenish its power source. The recharging point can include a tower within a radius of the delivery points, thus forming a part of the network.

Nonetheless, for the present invention, the capacity to replenish the power source for the UAV at the elevated structures enables an increased range of delivery/pickup routes for the UAV since the UAV does not have to return to the initiation point or recharging point before continuing on the delivery route. This enhances logistics of the system and increases efficiency for the delivery. In one embodiment, the UAV can replenish the power source at any elevated structure in the network irrespective of whether a package is being delivered or not. In this manner, the range of the UAV is expanded throughout the network of elevated structures.

One general aspect of the present invention provides a delivery system for transporting at least one package at a raised elevation with an unmanned aerial vehicle, the delivery system comprising: an unmanned aerial vehicle configured to deliver at least one package at a raised elevation, the unmanned aerial vehicle further configured to replenish a power source during the delivery; an initiation point configured to provide the at least one package to the unmanned aerial vehicle; and a plurality of delivery points configured to receive the at least one package from the unmanned aerial vehicle, each delivery point comprising an elevated structure configured to engage the unmanned aerial vehicle at a raised elevation for delivery of the at least one package and replenishment of the power source, the elevated structure comprising a docking end and a central shaft, the docking end configured to transfer the at least one package between the unmanned aerial vehicle and the elevated structure, the docking end further configured to at least partially replenish the power source of the unmanned aerial vehicle, each delivery point further comprising a lower structure dispose to join with the elevated structure, wherein the at least one package traverses between the elevated structure and the lower structure along the central shaft.

Another aspect of the present invention is that the unmanned aerial vehicle is a drone.

Still another aspect of the present invention is the logistical tracking of delivered packages that electronically confirms secured delivery eliminating need for redelivery attempts.

A further aspect is that the unmanned aerial vehicle comprises a package storage section configured to store the at least one package.

Another aspect is that the unmanned aerial vehicle comprises a docking section configured to engage the docking end of the elevated structure.

Another aspect is that the unmanned aerial vehicle comprises a power source.

Another aspect is that the docking end comprises a power supply apparatus configured to replenish the power/fuel source of the unmanned aerial vehicle.

Another aspect is that the initiation point comprises a warehouse of a package delivery organization.

Another aspect is that the plurality of delivery points comprises residential houses, governmental entities and commercial businesses.

Another aspect is that the elevated structure is a tower.

Another aspect is that the elevated structure comprises an elevator configured to convey the at least one package between the docking end and the lower structure along a central shaft.

Another aspect is that the power source is a rechargeable battery.

Another aspect is that the docking end comprises a power/fuel supply apparatus.

Another aspect is that the power supply apparatus is a battery recharger configured to recharge the power source of the unmanned aerial vehicle.

Another aspect is that the unmanned aerial vehicle is configured to communicate wirelessly with the initiation point and/or the plurality of delivery points.

Another aspect is that the system comprises a logistical, maintenance and safety software configured to control the unmanned aerial vehicle.

Another aspect is that each delivery point has a package recipient.

Another aspect is that the plurality of delivery points forms a network.

One general objective of the present invention is to create a more efficient delivery route by delivering the packages at a raised elevation and avoiding ground delivery routes.

Another objective is to utilize an energy efficient unmanned aerial vehicle, such as a drone, to perform delivery of packages.

Another objective is to increase the range of the unmanned aerial vehicle by providing recharging points throughout the network of delivery points and initiation points.

Another objective is to provide elevated structures, such as towers for the dual purpose of receiving the packages form the unmanned aerial vehicle, and replenishing the power source of the unmanned aerial vehicle simultaneously.

Another objective is to control and operate the unmanned aerial vehicle and delivery route with a logistical software that coordinates the sequence of deliveries, the route taken by the unmanned aerial vehicle, permissions for the deliveries, mechanical condition and maintenance of the unmanned aerial vehicle, changes in the delivery route, safety of UAV operation and weather patterns.

Another objective is to enable the package recipient to communicate with the unmanned aerial vehicle for real time control of the delivery.

Another objective is to enable a package delivery organization to create a cost efficient delivery system.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which:

FIG. 2A illustrates an exemplary elevated structure and a lower structure, FIG. 2B is an exploded view that illustrates the elevated structure with a middle section, and FIG. 2C is an exploded view that illustrates the elevated structure with two middle sections, in accordance with an embodiment of the present invention;

FIG. 5A illustrates the unmanned aerial vehicle dropping the package onto the elevator, FIG. 5B illustrates the package moving down the elevator, and FIG. 5C illustrates the package conveyed from the docking end of the elevated structure to the lower structure, in accordance with an embodiment of the present invention.

Like reference numerals refer to like parts throughout the various views of the drawings.

DETAILED DESCRIPTION OF THE INVENTION

Figure 1:
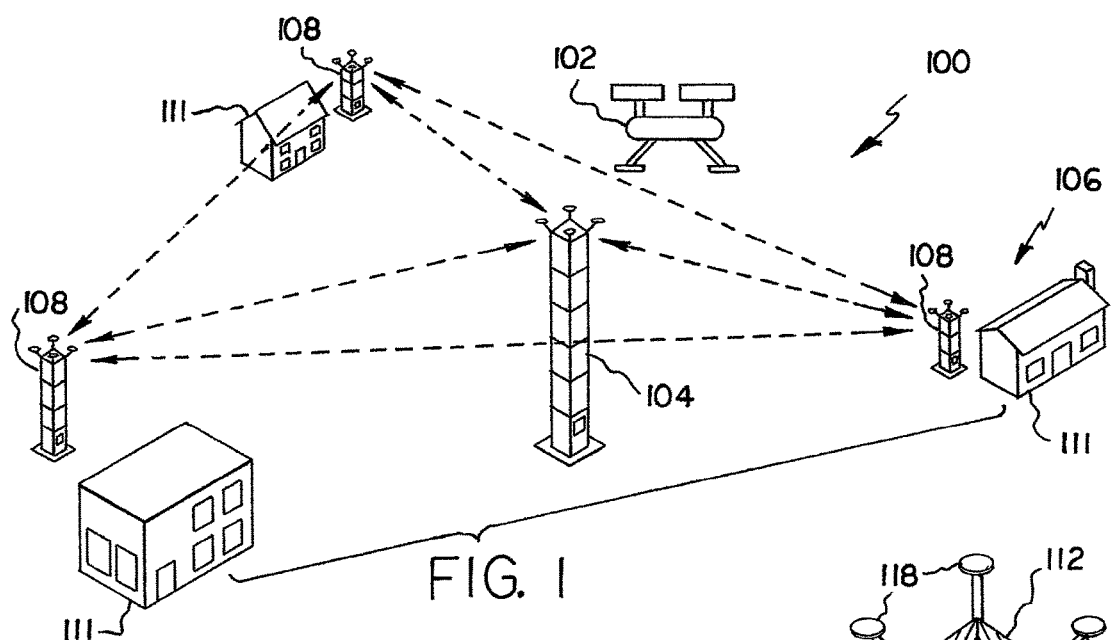
FIG. 1 illustrates a system diagram of an exemplary unmanned aerial vehicle delivery system delivering at least one package between a plurality of exemplary delivery points and an exemplary initiation point, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

In one embodiment of the present invention presented in FIGS. 1-5C, an unmanned aerial vehicle delivery system 100 provides delivery of at least one package 126 through an unmanned aerial vehicle (UAV) 102. The unmanned aerial vehicle delivery system provides a new method of delivery of packages. Packages are mechanically received and secured while delivery confirmation is electronically communicated through acceptable secure standard forms of communication of information. The system is a considerable improvement from the current human driven systems of delivering packages. The system 100 utilizes the UAV 102 as a means for delivering the package 126 between an initiation point 104 and a plurality of delivery points 106 at a raised elevation. Delivery points 106 are illustrated in FIG. 1 as a combination of a lower structure 111 and elevated structure 108. In other embodiments the delivery point is a single structure as depicted in FIGS. 2 A, B and C. The UAV 102 may also replenish a power source 120 at the delivery points 106 or at least one designated recharging point (not shown). The transport of the package 126 at the raised elevation provides numerous advantages to achieving a more efficient delivery route. Additionally, the delivery system 100 controls and monitors all aspects of the UAV 102 through a logistical software. The software is configured as a means to coordinate various logistical, maintenance and safety aspects of the UAV 102 and delivery route, including, without limitation, the sequence of deliveries, the route taken by the UAV 102, permissions for the deliveries, maintenance of the UAV 102, confirmation of secure delivery changes in the delivery route, and weather patterns. In some embodiments, the logistical software may include RFID or bar codes to track and organize the packages 126. The UAV 102 can also be remotely controlled by the logistic software in coordination with the flow of the packages 126. The UAV 102 maintains wireless communication with the initiation point 104 and the plurality of delivery points 106 to enable a real time delivery, so that spontaneous changes to the delivery can be made and electronically confirmed.

As depicted in FIG. 1, the UAV 102 performs deliveries of the at least one package 126 through a network comprised of an initiation point 104, a plurality of delivery points 106, and a recharging point. The UAV 102 flies between each point in an organized manner, using logistical software, commands from a package delivery organization, and guidance tools to coordinate the deliveries. One of the advantages of the present invention is that the UAV 102 engages the delivery points 106 at a raised elevation, so as to avoid ground level inefficiencies.

In one embodiment, the UAV 102 docks at an elevated structure 108 at the delivery point 106 for delivering the package 126 and replenishing a power source 120 on the UAV 102. The package 126 is conveyed along the elevated structure 108 to a lower structure 110 through an elevator 116, where it may be accessed. After the delivery is complete, the UAV 102 may replenish its power source 120 and/or continue on the delivery route. The elevated delivery routes and elevated structures 108 at the delivery points 106 enable the UAV 102 to provide a more efficient delivery by avoiding ground routes, delivering directly to elevated structures 108, which are generally easier to access than a ground delivery point. The delivery system 100 also provides a means for efficient logistical network of deliveries by enabling the UAV 102 to replenish its power source 120 at any of the delivery points 106, and thus negates the need to return to the initiation point 104 to replenish the power source 120.

In other embodiments, the UAV 102 is configured as a means to deliver the at least one package 126 at a raised elevation. The UAV 102 may include, without limitation, a drone, a helicopter, a propeller plane, and a hovercraft. The UAV 102 may utilize a power source 120 for operation. The power source 120 may include, without limitation, a rechargeable battery, an accumulator, an electrical battery, a fuel cell, natural gas and a fuel tank. The UAV 102 utilizes an initiation point 104 as a home base. The UAV 102 receives the package 126, performs maintenance, and returns after completing the deliveries to the initiation point 104. The initiation point 104 may include, without limitation, a central office for a package delivery organization, a warehouse, a fueling depot, a maintenance garage, and a data storage site.

In another embodiment, the plurality of delivery points 106 may include, without limitation, residential homes, retail stores, commercial warehouses, and governmental buildings. The delivery points 106 are not necessarily elevated at the package pickup point, but rather, at the elevated structure 108, where the UAV 102 docks for performing the delivery and power source 120 replenishment. The elevated structure 108 may include, without limitation, a tower that extends upwardly from a lower structure 110. The lower structure 110, may include a residential house, an office building, and a retail store positioned beneath the elevated structure 108. The lower structure 110 joins with and extends upwardly through the elevated structure 108 to form the delivery point. However, in other embodiments, a detached lower structure 111 may be proximal to the elevated structure 108, if not connected. A walkway may then connect the detached lower structure 111 to the elevated structure 108. The at least one package 126 may include, without limitation, a book, an auto part, food, videos, U.S. mail, medicine, an electronic device, and a container of a liquid or gas.

As depicted in FIG. 1, the UAV 102 initiates the delivery from an initiation point 104 where the at least one package 126 is loaded for delivery. The package 126 can be loaded manually, or through a conveyer system known in the art. The logistical software can coordinate the loading of multiple packages 126 based on the sequence of delivery points 106 on the route and other route conditions. After receiving the package 126 from the initiation point 104, the UAV 102 utilizes a guidance system to navigate the delivery route to the plurality of delivery points 106.

The UAV 102 docks at the elevated structure 108 over the delivery point 106 for delivering the package 126 to the lower structure 110 or the detached lower structure 111. The UAV 102 may also replenish the power source 120 while docked to the elevated structure 108. In one embodiment, the guidance system may include a remote sensing mechanism that guides the UAV 102 to the elevated structure 108. The remote sensing mechanism may include, without limitation, electromagnetic spectrum sensors, gamma ray sensors, biological sensors, and chemical sensors. In one embodiment, the UAV's 102 electromagnetic sensors include visual spectrum, infrared, or near infrared cameras as well as radar systems.

After receiving the appropriate permissions and monitoring the conditions of the route from the initiation point 104 and/or the logistical software, the UAV 102 navigates the optimal delivery route to perform the deliveries to the plurality of delivery points 106. In some embodiments, the UAV 102 identifies the appropriate delivery point 106. However, in other embodiments, a package recipient may dictate the route taken by the UAV 102, whereby instructions for delivery time are sent to the UAV 102 in real time.

Figure 2A:
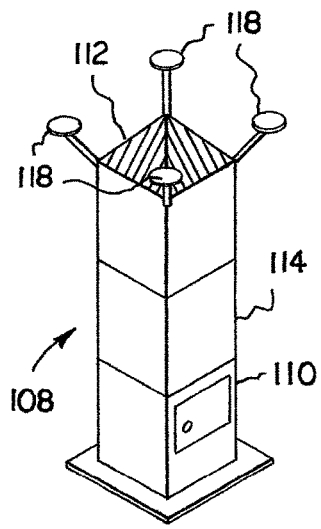
FIGS. 2A, 2B, and 2C illustrate perspective views of exemplary delivery points, where

Turning now to FIG. 2A, the elevated structure 108 may include, without limitation, a tower that extends upwardly from the lower structure 110. Those skilled in the art, in light of the present teachings, will recognize that the height of the elevated structure 108 is dependent on air flight regulations. For example, in congested areas, aircraft, such as the UAV 102, may be required to stay 1,000 feet higher than any obstacle, such as the delivery point within a 2,000 feet radius of the UAV 102. However, in less congested, sparsely populated areas, or over bodies of water, the UAV 102 may be required to remain at least 500 feet from the delivery point 106. Nonetheless, the delivery point 106 does have regulated air rights that enable the UAV 102 to engage the elevated structure 108.

Figure 2B:
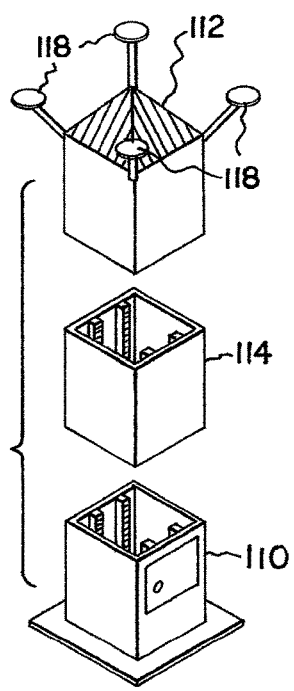
Figure 2C:
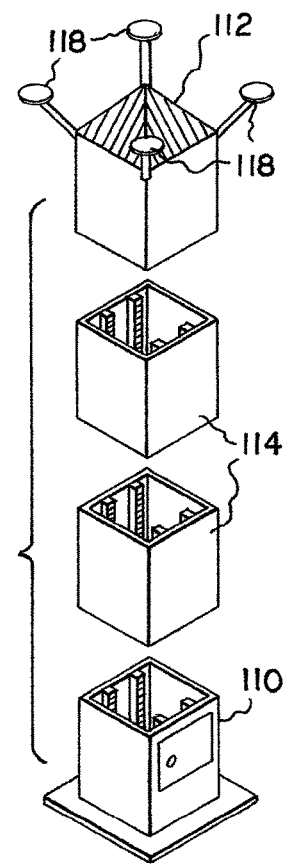

FIGS. 2B and 2C are exploded views that illustrate how the elevated structure 108 is arranged to join with the lower structure 110. In one embodiment, the lower structure 110, may include a residential house, an office building, and a retail store that are positioned beneath the elevated structure 108. The at least one package 126 may include, without limitation, a book, an auto part, food, videos, medicine, an electronic device, and a container of a liquid or gas. However in one alternative embodiment, the package 126 may include garbage, whereby the garbage travels the length of the elevated structure 108 for pickup by the UAV 102.

FIG. 2A shows the elevated structure 108 comprising a central shaft 114 and a docking end 112. The docking end 112 is configured to receive the UAV 102 for docking and recharging. In one embodiment, the docking end 112 utilizes electromagnetic forces to lock the UAV 102 into a docking position. This enhances the safety of the UAV 102 and the elevated structure 108 during inclimate weather or mechanical failures. Similarly, the UAV 102 comprises a docking section 122 that mates with the docking end 112 of the elevated structure 108 to form a secure coupling to the elevated structure 108. The docking end 112 also receives the at least one package 126 for conveyance to the lower structure 110.

Figure 3:
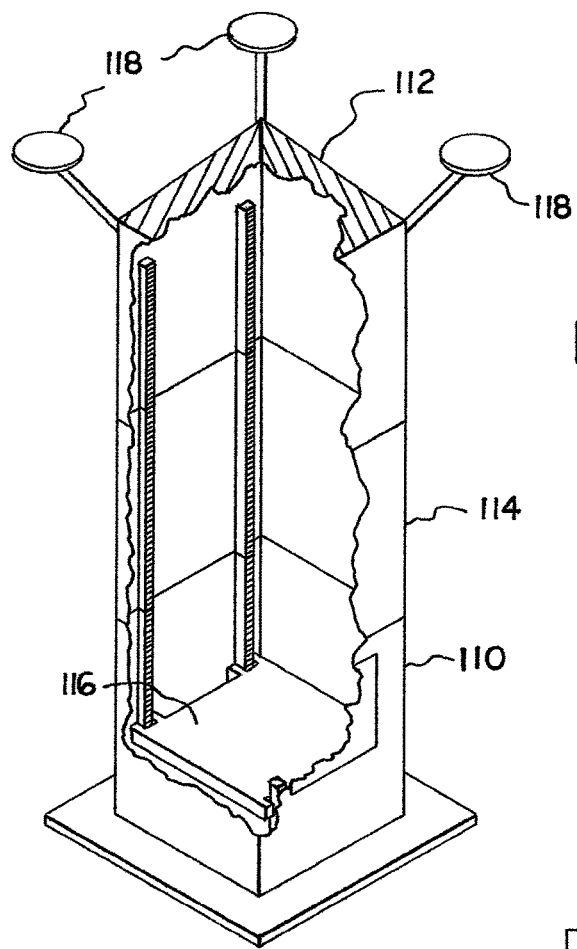
FIG. 3 illustrates a cross-sectioned view of the elevated structure and an exemplary elevator extending from an exemplary docking end to an exemplary lower structure through an exemplary central shaft, in accordance with an embodiment of the present invention.

Turning now to FIG. 3, an elevator 116, such as a dumb waiter, extends from the docking end 112 through the central shaft 114 as a means for conveying the at least one package 126 to the lower structure 110. However, in other embodiments, a gravity fed mechanism may be used to convey the package 126 along the length of the central shaft 114. Once the package 126 arrives at the lower structure 110 or a detached lower structure 111, it can be accessed. However, in some embodiments, such as returned packages, the package 126 is conveyed up from the lower structure 110 to the docking end 112 of the elevated structure 108.

Figure 4:
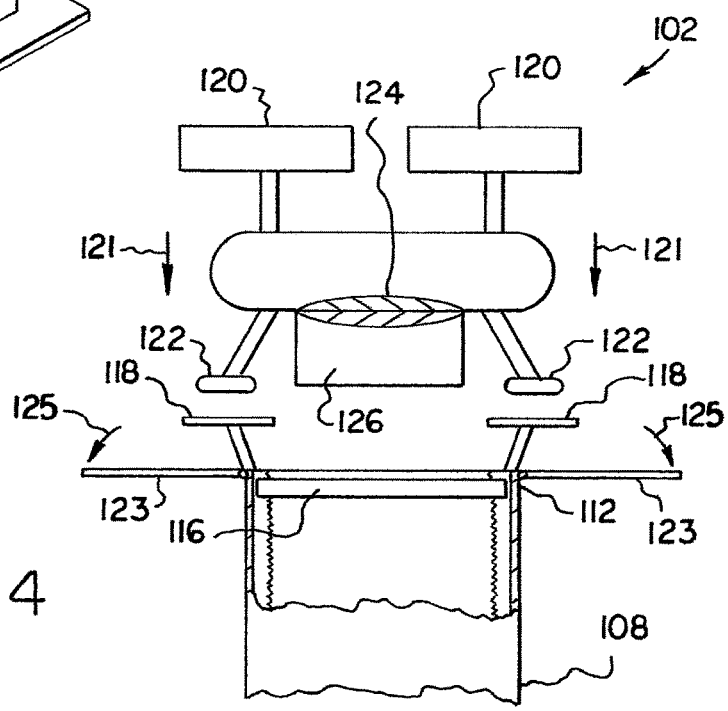
FIG. 4 illustrates the unmanned aerial vehicle docking with the elevated structure, in accordance with an embodiment of the present invention.
Figure 5A:
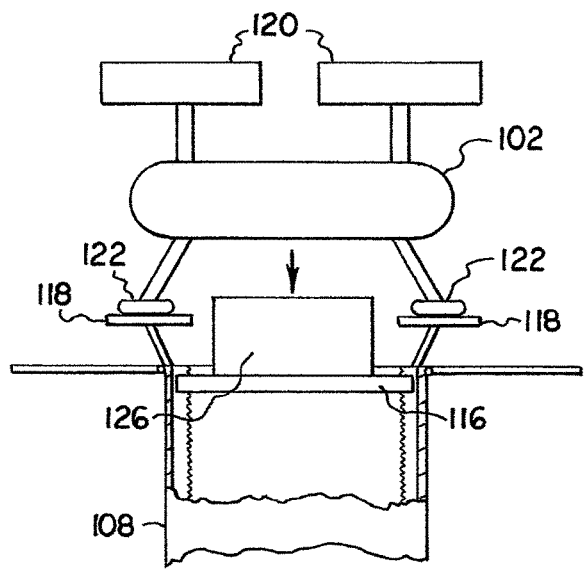
FIGS. 5A, 5B, and 5C illustrate the unmanned aerial vehicle delivering an exemplary package to the delivery point through the elevated structure, where
Figure 5B:
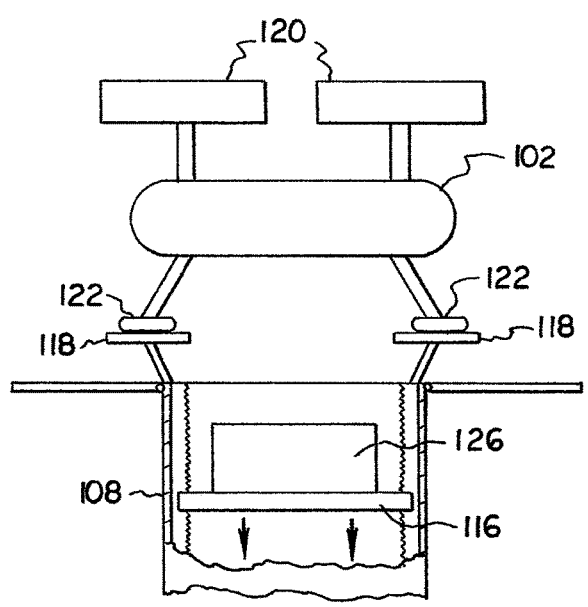
Figure 5C:
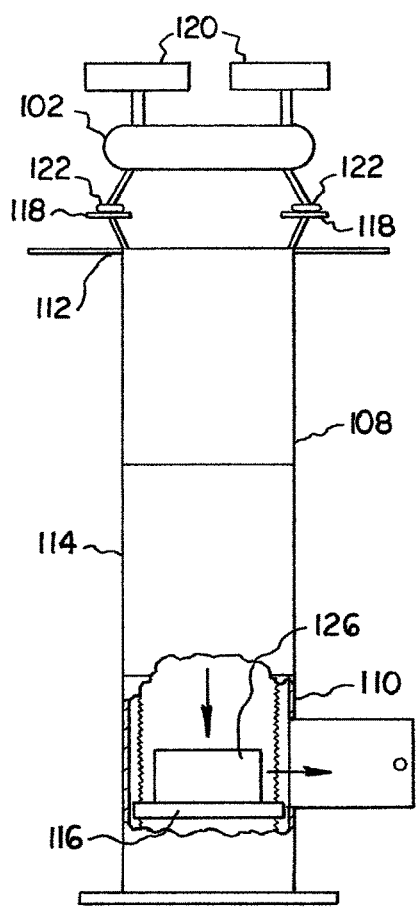

FIG. 4 references The UAV 102 engaging the elevated structure 108. The UAV 102 may include a docking section 122 that mates with the docking end 112 to form a secure coupling to the elevated structure 108. The docking end 112 also receives the at least one package 126 for conveyance to the lower structure 110. The UAV 102 includes a package storage section 124. The package storage section 124 is configured as a means to receive the package 126 at the initiation point 104, store the package 126 during the delivery route, and unload the package 126 at the destination point. The package storage section 124 may be configured to receive variously sized and dimensioned packages 126, including but not limited to things like liquids, gases, and animals.

Elevated structure 108 also includes movable closing structures 123 that open and swing close generally in the direction of arrow 125. These closing structures 123 are configured to allow the UAV 102 to land in generally the direction of arrows 121 to deliver a package 126 through an opening and then close the opening to secure the package 126 within the elevated structure 108. The tower closing structures 123 are configured as a means for enclosing the UAV 102 during refueling, or while connecting to the Internet for logistical checkup or to simply dock to avoid poor weather or as a safe haven to dock for a period of time to accommodate the next scheduled delivery. The UAV 102 is also configured to dock with power supply apparatus 118 through electromagnetic technology or other means known in the art to temporary lock and secure UAV 102 while stationed in the docking bay or on the platform of elevated structure 108.

FIGS. 1, 2, 3, 4, 5A, 5B, and 5C illustrate the UAV 102 delivering the package 126. The docking section 122 of the UAV 102 mates with the docking end 112 of the elevated structure 108 to form a secure coupling to the elevated structure 108. The docking end 112 also receives the at least one package 126 for conveyance to the lower structure 110. The elevator 116 carries the package 126 from the docking end 112 to the lower structure 110 through the central shaft 114. The elevator 116 may operate in either direction. In one embodiment, the elevator 116 automatically moves to meet the UAV 102 for receiving the package 126 when the UAV 102 transmits a signal to the delivery point 106 to create a more efficient delivery and pickup time. After the elevator 116 conveys the package 126 along the central shaft 114, the package 126 may be picked up at the lower structure 110.

In some embodiments, the completion of the secured delivery to the lower structure 110 is confirmed with the package recipient and/or the package delivery organization. The confirmation may include, without limitation, a text, an email, a phone call, a printed receipt. In one alternative embodiment, the system 100 may also request that the package recipient perform a survey after receipt of the package 126. In another embodiment, returns are confirmed in the same way.

In another embodiment, the docking end 112 of the elevated structure 108 may also include a power supply apparatus 118 that replenishes the power source 120 on the UAV 102. The power supply apparatus 118 can include an AC power source 120, a 12 volt DC outlet, a solar power source 120, natural gas and a fuel tank. Those skilled in the art will recognize that a power supply apparatus 118, such as a battery charger for a rechargeable battery in the UAV 102 also monitors battery voltage, current flow, and battery temperature to minimize charging time. In another embodiment, the system 100 comprises at least one recharging point, separate from the initiation point 104 or delivery points 106, where the UAV 102 may replenish its power source 120. The recharging point can include a tower within a radius of the delivery points 106, thus forming a part of the network. secure Nonetheless, for the present invention, the capacity to replenish the power source 120 for the UAV 102 at each of the elevated structures 108 enables an increased range of delivery routes for the UAV 102 since the UAV 102 does not have to return to the initiation point 104 or recharging point before continuing on the delivery route. This enhances logistics of the system 100 and increases efficiency for the delivery. In one embodiment, the UAV 102 can replenish the power source 120 at any elevated structure 108 in the network irrespective of whether a package 126 is being delivered or not. In this manner, the range of the UAV 102 is expanded throughout the network of elevated structures.

The delivery system 100 addresses the logistical and practical needs of a package delivery organization through use of a logistical software. The logistical software is configured to enable the package delivery organization to control and monitor the UAV 102 during delivery to the plurality of delivery points 106. The software also enables the package delivery organization to control every aspect of the UAV 102, both before and during deliveries between the initiation point 104 and the network of delivery points 106.

However, in alternative embodiments, a package recipient at the delivery point 106 may at least partially control the UAV 102 and the conditions of the delivery. For example, the package recipient selects a desired date for delivery, or has multiple packages 126 delivered to other delivery points 106 in a predetermined sequence, i.e., commercial products. In some embodiments, the UAV 102 remains in constant communication with the package delivery organization and/ or the package recipient during the delivery. In this manner, the UAV 102 may confirm the package 126 to be delivered, provide an expected time of delivery, and receive electronic signatures after the package 126 has been delivered.

The logistical, maintenance and safety software is configured to help diagnose the mechanical integrity of the UAV 102 prior to commencing on the delivery route, during the delivery, and after completing the delivery. The software may also be configured to monitor a weather pattern prior to approving a delivery or during selection of an optimal route for delivery. Furthermore, the software may utilize wireless communications, such as internet, Wi Fi, satellites, or radio signals for control and communication with the UAV 102, the initiation point 104, and the delivery points 106. The logistical, maintenance and safety software is configured to communicate with governmental or regulatory agencies such as but not limited to NASA and the FAA for the purposes of obtaining and using information regarding safety and flight path control restrictions, weather fronts, air traffic control and no flying zones and the like.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence. While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the term "means for" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

What I claim is:

1. A delivery system for transporting at least one package, the delivery system comprising:
   an unmanned aerial vehicle
   an initiation point;
   a plurality of delivery points;
   each delivery point comprising an elevated structure for transporting the at least one package and replenishing of a battery connected to the unmanned aerial vehicle;
   a power supply apparatus, wherein the power supply apparatus is a battery recharger comprised of a plurality of extension posts, wherein each extension post extends upward and outward from the elevated structure to a flat conductive surface, such that the flat conductive surface is above the elevated structure and outside a perimeter of the elevated structure;
   wherein extension posts of a docking section of the unmanned aerial vehicle are symmetrical with the extension posts of the power supply apparatus;
   wherein each flat conductive surface of the docking section of the unmanned aerial vehicle mates with a corresponding flat conductive surface of the power supply apparatus;
   the elevated structure comprising a docking end and a central shaft,
   the docking end having a package aperture through which to transfer the at least one package between the unmanned aerial vehicle and the elevated structure,
   the docking end further configured to at least partially replenish the battery of the unmanned aerial vehicle,
   each delivery point further comprising a lower structure; and
   at least one recharging point configured to at least partially replenish the battery of the unmanned aerial vehicle.

2. The system of claim 1, wherein the elevated structure is a tower, the tower comprising an elevator configured to convey the at least one package between the docking end and the lower structure.

3. A delivery system for transporting at least one package, the delivery system comprising: an unmanned aerial vehicle; an initiation point; and a plurality of delivery points, each delivery point comprising an elevated structure for engaging the unmanned aerial vehicle at a raised elevation for delivery of the at least one package and replenishment of a battery connected to the unmanned aerial vehicle;
   a power supply apparatus, wherein the power supply apparatus is a battery recharger comprised of a plurality of extension posts, wherein each extension post extends upward and outward from the elevated structure to a flat conductive surface, such that the flat conductive surface is above the elevated structure and outside a perimeter of the elevated structure;
   wherein each flat conductive surface of a docking section of the unmanned aerial vehicle mates with a corresponding flat conductive surface of the power supply apparatus;
   wherein a number of extension posts of the power supply apparatus totals four; the elevated structure comprising a docking end and a central shaft, the docking end configured to transfer the at least one package between the unmanned aerial vehicle and the elevated structure, each delivery point further comprising a lower structure, wherein the at least one package traverses between the elevated structure and the lower structure through the central shaft.

* * * * *